United States Patent [19]

Ohkumo et al.

[11] Patent Number: 5,056,326
[45] Date of Patent: Oct. 15, 1991

[54] APPARATUS FOR CONTROLLING AIR CONDITIONING UNIT FOR AUTOMOTIVE VEHICLE

[75] Inventors: Hiroya Ohkumo; Shuji Miyama, both of Tokyo, Japan

[73] Assignee: Fuji Jukogyo Kabushiki Kaisha, Tokyo, Japan

[21] Appl. No.: 523,536

[22] Filed: May 15, 1990

[30] Foreign Application Priority Data

May 18, 1989 [JP] Japan .................................. 1-125140

[51] Int. Cl.$^5$ .............................................. B60H 3/04
[52] U.S. Cl. ....................................... 62/133; 62/243; 62/323.4
[58] Field of Search .............. 62/133, 230, 243, 323.4, 62/323.1; 165/43, 44; 123/339, 198 R

[56] References Cited

U.S. PATENT DOCUMENTS

| 4,206,613 | 6/1980 | Shockley | 62/133 |
| 4,510,764 | 4/1985 | Suzuki | 62/133 |

FOREIGN PATENT DOCUMENTS

| 0044511 | 3/1982 | Japan | 62/133 |
| 59-200038 | 11/1984 | Japan . | |
| 0202926 | 11/1984 | Japan | 62/133 |
| 0242713 | 10/1988 | Japan | 62/133 |

Primary Examiner—Harry B. Tanner
Attorney, Agent, or Firm—Beveridge, DeGrandi & Weilacher

[57] ABSTRACT

An apparatus for controlling an air conditioning unit for an automotive vehicle includes an air conditioner switch for operating a compressor, engine speed detecting means, engine speed variation rate calculating means, engine speed reducing state determining means, and means for controlling the compressor to hold in an inoperative state even when the air conditioner switch is in a close state.

4 Claims, 2 Drawing Sheets

APPARATUS FOR CONTROLLING AIR CONDITIONING UNIT FOR AUTOMOTIVE VEHICLE

BACKGROUND OF THE INVENTION

1. Field of the Invention

The present invention relates generally to an apparatus for controlling an air conditioning unit for an automotive vehicle. More specifically, the present invention relates to the improvement of an apparatus for controlling the air conditioning unit for the automotive vehicle wherein the operation of a compressor is controlled depending upon the operative conditions of the air conditioning unit when an engine speed variation rate is smaller than a predetermined negative value.

2. Description of the Background Art

Generally, with respect to an air conditioning unit for an automotive vehicle, when an air conditioner switch is manually shifted to ON by the driver, or when the switch is automatically actuated in response to the temperature as is often the case with automatic air conditioning units, a compressor is operatively connected to an engine via an electromagnetic clutch so that the compressor starts operation for the purpose of cooling. If the engine speed is reduced to a low level, e.g., an engine idle speed, during the operation of the compressor, an engine idle speed control system provided in an air intake system carries out the first idle control for increasing the engine speed up to a first engine idle speed to prevent the drop in the engine speed. One example of the aforementioned control system is disclosed in an official gazette of Japanese Laid-Open Patent No. 200038/1984.

With respect to the conventional air conditioning unit, when the electromagnetic clutch is connected, the load of the compressor is immediately imposed on the engine. Therefore, the engine idle speed control system opens a throttle valve to increase the air flow rate and at the same time increases a quantity of fuel to be fed to the engine for increasing an engine torque. However, this leads to the problem that there is a delay in the engine speed increasing up to the first idle speed. To obviate the foregoing problem, it has been proposed that a controller carries out the first idle control when the switch is shifted to ON and then operates the compressor after the controller detects the increase of the engine speed in order to prevent the engine speed from dropping. However, in the case where the engine speed is reduced from a high level according to racing or disconnecting a main clutch during running of the vehicle, the controller carries out the first idle control at the same time the compressor begins operating, since the engine speed is still high when the switch is shifted to ON. Therefore, the engine speed is substantially dropped due to delay of the generation of the engine torque by the first idle control. Consequently, another problem or malfunction, such as, engine stop, vibration and, incomplete drivability arises. If the switch is shifted to ON under such operative conditions as described above, it becomes necessary to take an adequate countermeasure for preventing the engine speed from dropping.

To shorten such a delay of the first idle control as described above, several solutions have been proposed such that the weight of a flywheel is increased to retard the drop of the engine speed and that the volume of the intake air system is reduced to increase the response of the first idle control. However, the former proposal has a problem in that the response may be degraded excessively while the latter proposal has another problem that the ending performance of the engine output and the engine layout are adversely affected.

In case where the controller carries out the control such that the compressor starts its operation with delay after the completion of the first idle control, a malfunction, e.g., the over running of the engine tends to occur and thereby it becomes difficult to correctly set time delay due to the dimensional and functional differences in production lots of the engine.

SUMMARY OF THE INVENTION

The present invention has been made with the foregoing background in mind.

An object of the present invention is to provide an apparatus for controlling an air conditioning unit for an automotive vehicle wherein the apparatus makes it possible to prevent the engine speed from being reduced when a switch for the air conditioning unit is shifted to ON under such a condition as represented by a large engine speed reduction rate.

To accomplish the above object, the present invention provides an apparatus for controlling an air conditioning unit for an automotive vehicle wherein an engine is operatively connected to a compressor via a clutch which is to be connected or disconnected in response to a signal outputted from a controller, wherein the apparatus comprises an air conditioner switch closed to operate the compressor, means for detecting an engine speed, means responsive to the engine speed for calculating an engine speed variation rate, means responsive to the engine speed variation rate for determining a reducing state of the engine speed and for producing a determining signal, and means responsive to the determining signal for controlling the compressor to hold in an inoperative state even though the air conditioner switch is in a closed state.

Since the apparatus of the present invention is constructed in the above-described manner, the clutch is engaged or disengaged by the controlling means depending on whether the air conditioner switch is shifted to ON or OFF, whereby the compressor is brought in an operative state or in an inoperative state. When the compressor is held in the inoperative state under such a condition that the engine speed variation rate is smaller than the predetermined negative value, e.g., at the racing, the controller inhibits the compressor from operating even if the air conditioner switch is actuated. Consequently, with the apparatus of the present invention, there is no danger that the engine stops.

Other objects, features and advantages of the present invention will become readily understood from the following description with reference to the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which schematically illustrate an apparatus for controlling an air conditioning unit for an automotive vehicle in accordance with a preferred embodiment thereof.

Figure 1:
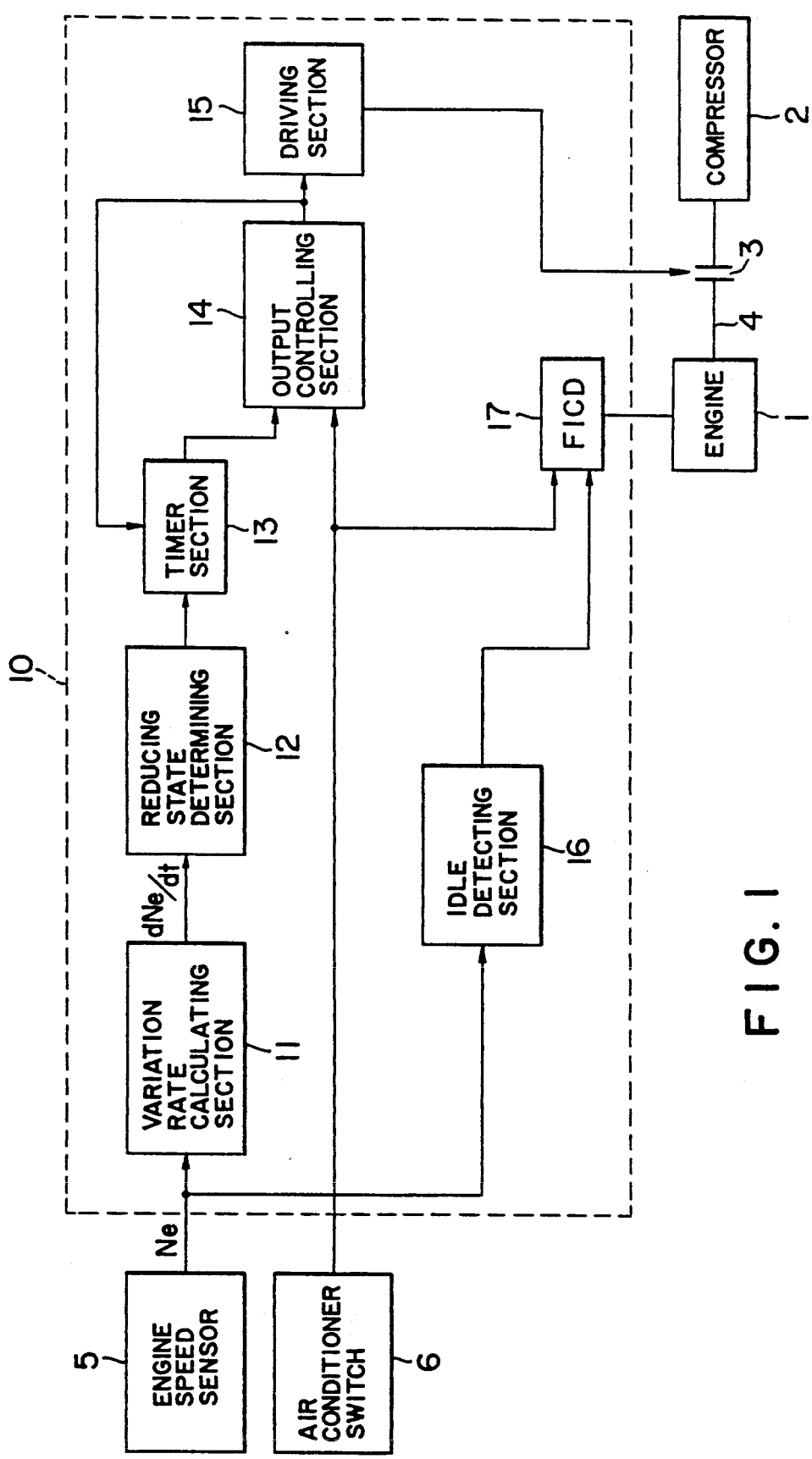
FIG. 1 is a block diagram which schematically illustrates the structure of an apparatus for controlling an air conditioning unit for an automotive vehicle in accordance with an embodiment of the present invention.

In FIG. 1, reference numeral 1 designates an engine for the vehicle and reference numeral 2 designates a compressor for the air conditioning unit. The engine 1 is operatively connected to the compressor 2 via a power transmission mechanism 4 including an electromagnetic clutch 3. A control system for the apparatus includes an engine speed sensor 5 and an air conditioner switch 6 so that an engine speed Ne outputted from the engine speed sensor 5 is inputted into an engine speed variation rate calculating section 11 in a controller 10 to calculate an engine speed variation rate $dNe/dt$. The engine speed variation rate $dNe/dt$ is then inputted into a reducing state determining section 12. When the $dNe/dt$ is reduced and then becomes equal to or less than K which designates a predetermined negative determination constant, a determining signal is outputted to a timer section 13. The timer section 13 includes a timer to count an elapsed time and clears the timer when the determining signal is inputted. The timer section 13 produces a first signal after a predetermined period of time (e.g., 2 seconds) has elapsed. Thereafter, the first or second signal from the timer section 13 and a signal from the switch 6 are inputted into an output controlling section 14. In case where an ON-signal from the switch 6 and the first signal outputted from the timer section 13 are simultaneously inputted into the output controlling section 14, a command signal is outputted to the electromagnetic clutch 3 via a driving section 15 to operate the compressor 2. On the other hand, in case where the controlling section 14 inputs an OFF-signal from the switch 6 or the second signal from the timer section 13, the controlling section 14 does not output any command signal. The timer section 13 also clears the timer when the output controlling section 14 does not produce any command signal.

On the other hand, an idle control system includes an idle detecting section 16 into which the engine speed Ne is inputted. The idle detecting section 16 detects an idle state and produces an idling detecting signal when the engine speed Ne reaches a predetermined idle speed. The idle detecting signal and the signal from the air conditioner switch are inputted into a first idle controlling section (FICD) 17 which carries out the first idle control.

Figure 2:
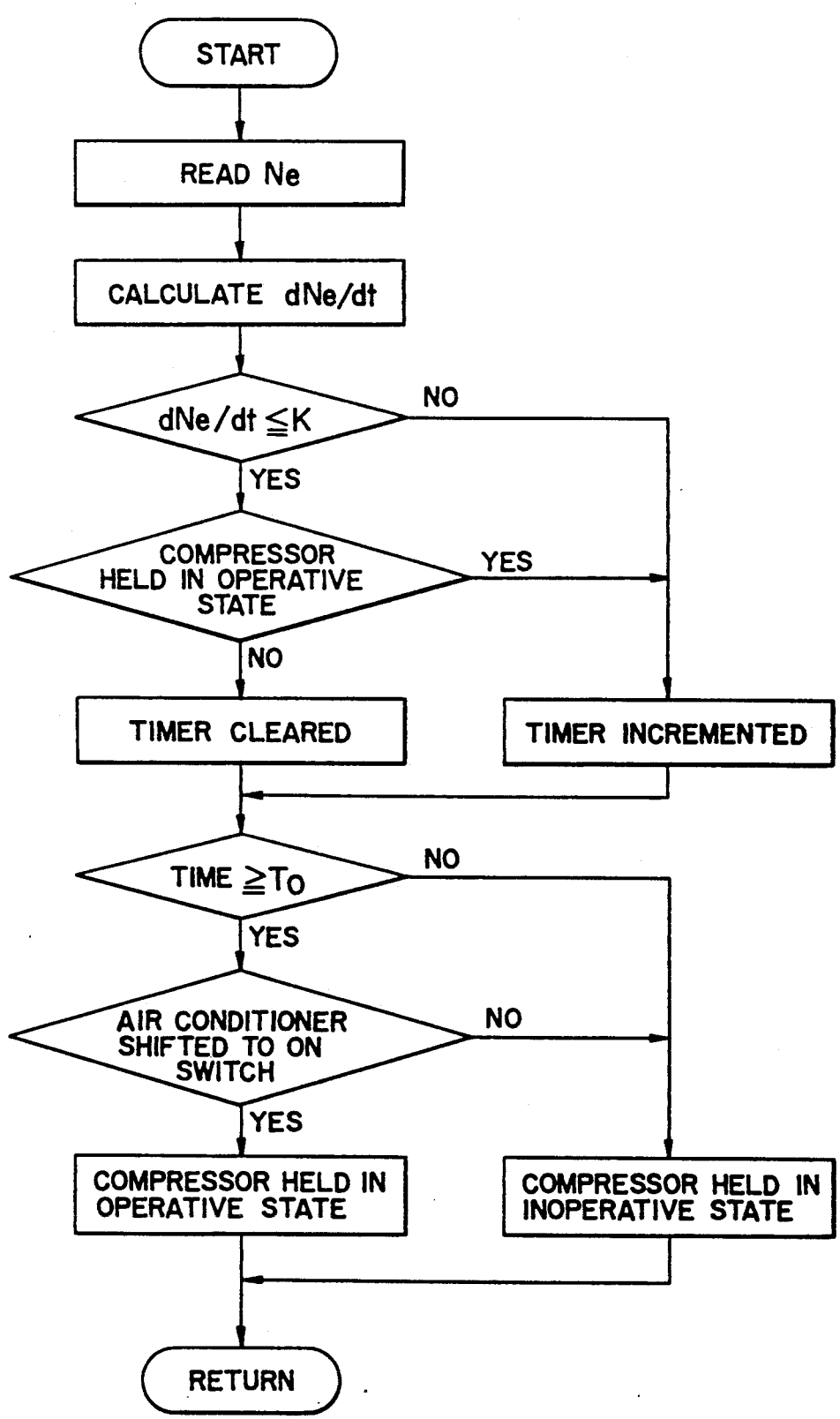
FIG. 2 is a flowchart which illustrates the operations to be performed by the apparatus shown in FIG. 1.

The operation of the apparatus as constructed in the above-described manner will be described below with reference to a flowchart shown in FIG. 2.

While the engine is running, the engine speed N is inputted into the variation rate calculating section 11 from the engine speed sensor 5 to calculate the engine speed variation rate $dNe/dt$. A result derived from the calculation in the calculating section 11 is inputted into the deceleration determining section 12. Thus, the controller 11 determines that the engine speed is rapidly dropped.

Since the engine speed variation rate $dNe/dt$ is larger than the constant value K during running of the vehicle in a steady state or during acceleration of the vehicle, the timer in the timer section 13 counts time and the first signal from the timer section 13 is inputted into the output controlling section 14 after the predetermined period of time $T_o$ elapses, so that the system is in a ready state to operate the compressor 2. Therefore, when the switch 6 is shifted to ON in the ready state, the clutch 3 immediately receives a command signal to operate the compressor 2 by the engine 1 for the purpose of cooling. If the idle detecting section 16 detects the idling state while the switch 6 is shifted to ON, the engine 1 is controlled by the first idle controlling section 17 to increase the engine speed up to a first idle engine speed so as to prevent the engine speed dropping in response to load of the compressor 2.

In case where the engine speed Ne quickly drops during running of the vehicle, $dNe/dt \leq K$ is satisfied. If the compressor 2 is in an inoperative state at this time, the timer section 13 clears the timer and thereby the output controlling section 14 holds the compressor 2 in the inoperative state responsive to the second signal from the timer section 13. Therefore, even if an ON signal is inputted into the switch 6 under the foregoing condition, the controller 10 inhibits the compressor 2 from operating. Consequently, the aforementioned operation prevents the engine 1 from stopping.

Thereafter, the engine speed Ne is reduced to a level in the vicinity of the engine idle speed and the engine variation rate increase above the predetermined negative value, so that the timer in the timer section 12 starts to count time. After the predetermined period of time $T_o$, the compressor 2 is restored to the operative state. Thus, when the switch 6 is shifted to ON, the compressor 2 starts its operation. Since the engine speed Ne is steadily held at the substantially idle engine speed at this time, the controller 10 performs the first idle control via the first idle controlling section 17 without delay, whereby the engine 1 receives the load of the compressor 2 under the condition of the first idle engine speed.

In the case where the compressor 2 has already operated under the condition of $dNe/dt \leq K$, the controller 10 continues the operative state of the compressor 2 even if the switch 6 changes to ON.

While the present invention has been described above with respect to a single preferred embodiment thereof, it should of course be understood that it should not be limited only to this. Alternatively, the engine speed variation rate may be calculated based on $dNe/d\theta$ by using a crank angle $\theta$.

As will be readily apparent from the above description, according to the present invention, the controller inhibits the compressor from operating irrespective of the present state of actuation of the air conditioner switch, when the engine variation rate is smaller than the predetermined negative value. Consequently, the controller completely prevents the engine speed from dropping without an occurrence of the engine stalling, vibration or the like malfunction. Therefore, the apparatus of the present invention offers an advantageous effect whereby drivability of the vehicle is stabilized.

It should be added that since the operation of the compressor is prohibited until the engine speed variation rate is restored, the cooling capability of the air conditioning unit is not adversely affected.

While the presently preferred embodiment of the present invention has been shown and described, it is to be understood that this disclosure is for the purpose of illustration and that various changes and modifications may be made without departure from the scope of the invention as defined by the appended claims.

What is claimed is:

1. An apparatus for controlling an air conditioning unit for an automotive vehicle wherein an engine is operatively connected to a compressor via a clutch which is to be connected or disconnected in response to a signal outputted from a controller, comprising:
   an air conditioner switch 6 being closed to operate the compressor,
   detecting means 5 for detecting an engine speed,
   calculating means 11 responsive to the engine speed for calculating an engine speed variation rate,
   determining means 12 responsive to the engine speed variation rate for determining a reducing state of the engine speed and for producing a determining signal, and
   controlling means 13, 14, 15 responsive to the determining signal for controlling the compressor to hold in an inoperative state even though the air conditioner switch is in a closed state.

2. The apparatus according to claim 1, further comprising generating means 13 for generating a signal to allow the operation of the compressor by the controlling means when a predetermined period of time elapses during which time the determining signal is not produced, whereby the compressor can be operated when the air conditioner switch is in the closed state.

3. The apparatus according to claim 2, wherein said generating means includes a timer for counting said predetermined period of time.

4. The apparatus according to claim 1, wherein said determining means is applied to determine the reducing state when the engine speed variation rate becomes lower than a predetermined negative value.

* * * * *